United States Patent [19]

Matsubara

[11] Patent Number: 5,179,494
[45] Date of Patent: Jan. 12, 1993

[54] EXCESS VOLTAGE PROTECTION APPARATUS FOR AN ELECTRIC VEHICLE

[75] Inventor: Masayoshi Matsubara, Kariya, Japan

[73] Assignee: Kabushiki Kaisha Toyoda Jidoshokki Seisakusho, Kariya, Japan

[21] Appl. No.: 510,088

[22] Filed: Apr. 17, 1990

[30] Foreign Application Priority Data

Apr. 18, 1989 [JP] Japan .................. 1-45189[U]

[51] Int. Cl.⁵ .................. B60L 11/18; B60L 3/00; H02H 3/20
[52] U.S. Cl. .................. 361/91; 180/65.3; 180/65.8; 318/138; 318/635
[58] Field of Search .................. 361/23, 24, 33, 34, 361/86, 90, 91, 98; 180/65.3, 65.8; 318/139, 635, 812

[56] References Cited

U.S. PATENT DOCUMENTS

| | | | |
|---|---|---|---|
| 4,418,778 | 12/1983 | Sato et al. .................. | 180/132 |
| 4,449,080 | 5/1984 | Konrad et al. .................. | 318/139 |
| 4,492,955 | 1/1985 | Kabota et al. .................. | 340/636 |
| 4,698,582 | 10/1987 | Braun et al. .................. | 361/86 |
| 4,816,963 | 3/1989 | Eden .................. | 361/91 |
| 4,893,211 | 1/1990 | Bynum et al. .................. | 361/91 |

FOREIGN PATENT DOCUMENTS

| | | | |
|---|---|---|---|
| 54-25006 | 2/1979 | Japan .................. | 361/33 |
| 121989 | 6/1985 | Japan .................. | 361/33 |
| 296409 | 12/1988 | Japan .................. | 361/91 |
| 2-74195 | 3/1990 | Japan .................. | 361/33 |

Primary Examiner—Geoffrey S. Evans
Attorney, Agent, or Firm—Brooks Haidt Haffner & Delahunty

[57] ABSTRACT

A protection device is provided for a control apparatus for use in an electronic automobile with a motor and a transistor for driving the motor. The protection device comprises a short-circuit detecting device for detecting a short-circuit state of the transistor and, an excess voltage detecting device connected to the transistor for comparing a voltage applied to the transistor and motor of the control apparatus with a predetermined voltage, thereby detecting an excess voltage applied when a plug of a charger is erroneously connected to a plug receiver of the control apparatus.

7 Claims, 6 Drawing Sheets

EXCESS VOLTAGE PROTECTION APPARATUS FOR AN ELECTRIC VEHICLE

BACKGROUND OF THE INVENTION

The present invention relates to a protection apparatus for a control device for use in an electric automobile such as a forklift, called a battery forklift hereinafter.

The battery forklift is provided with a control apparatus for controlling its operation. This control apparatus is provided with a transistor for controlling a power motor and a load motor. The load motor drives an oil pump for executing a loading operation. The transistor is liable to be short circuited due to the influence of temperature or some abnormality. To deal with this fault, a protection device is provided for detecting a short-circuit state in the transistor of the control apparatus and for preventing excess current from flowing through the power motor and the load motor.

In the prior art, a protection circuit is provided for preventing excess current from flowing in the motor, the excess current being caused by a short circuit in the transistor. However, this protection circuit protects against a short circuit fault in the drive transistor of the motor, but not against excess voltage. The battery in a battery forklift must be periodically charged by a separately provided charger electrically connected to it. The charging current is large. The electrical connection between the battery and the charger is made with a plug receiver of the same structure and shape as that between the battery and the control apparatus, and the plug and plug receiver of the same shape are used for the battery, the charger and the control apparatus. This structure is simple and it enables the plug and plug receiver to withstand a large current and to be easily connected with the correct polarity.

When, the plug and plug receiver are of the same shape, as recited above, they are difficult to distinguish from each other because of their similar appearance. Thus, the plug of the charger may be inadvertently connected to the plug receiver of the control apparatus instead of the plug receiver of the battery. If this inadvertent connection occurs, since the output voltage of the charger is naturally higher than the output voltage of the battery which is normally to be connected to the control apparatus, an excess voltage is supplied from the charger to the transistor and motor within the control apparatus. Conventionally, a countermeasure is provided for a short circuit fault of the transistor in the motor drive, but no countermeasure is provided for an application of an excess voltage to a structure part caused by the inadvertent erroneous connection of the plug of the charger to the plug receiver of the control apparatus. Thus, the transistor and the port of the motor would be destroyed by the excess voltage.

SUMMARY OF THE INVENTION

An object of the invention is to provide an excess current protection device for a battery-operated apparatus for solving the problem of damage to the ports of an apparatus by an excess voltage caused by an inadvertent erroneous connection of the plug and the plug receiver.

A feature of the present invention resides in a protection device of a control apparatus for use in an electronic automobile with a motor and a transistor for driving the motor. This device comprises a short circuit detecting means for detecting a short circuit state of the transistor for performing a drive control of said motor and an excess voltage detecting means connected to said transistor for comparing the voltage applied to said transistor and the motor of said control apparatus with the predetermined voltage, thereby detecting the excess voltage.

PREFERRED EMBODIMENT

Figure 1:
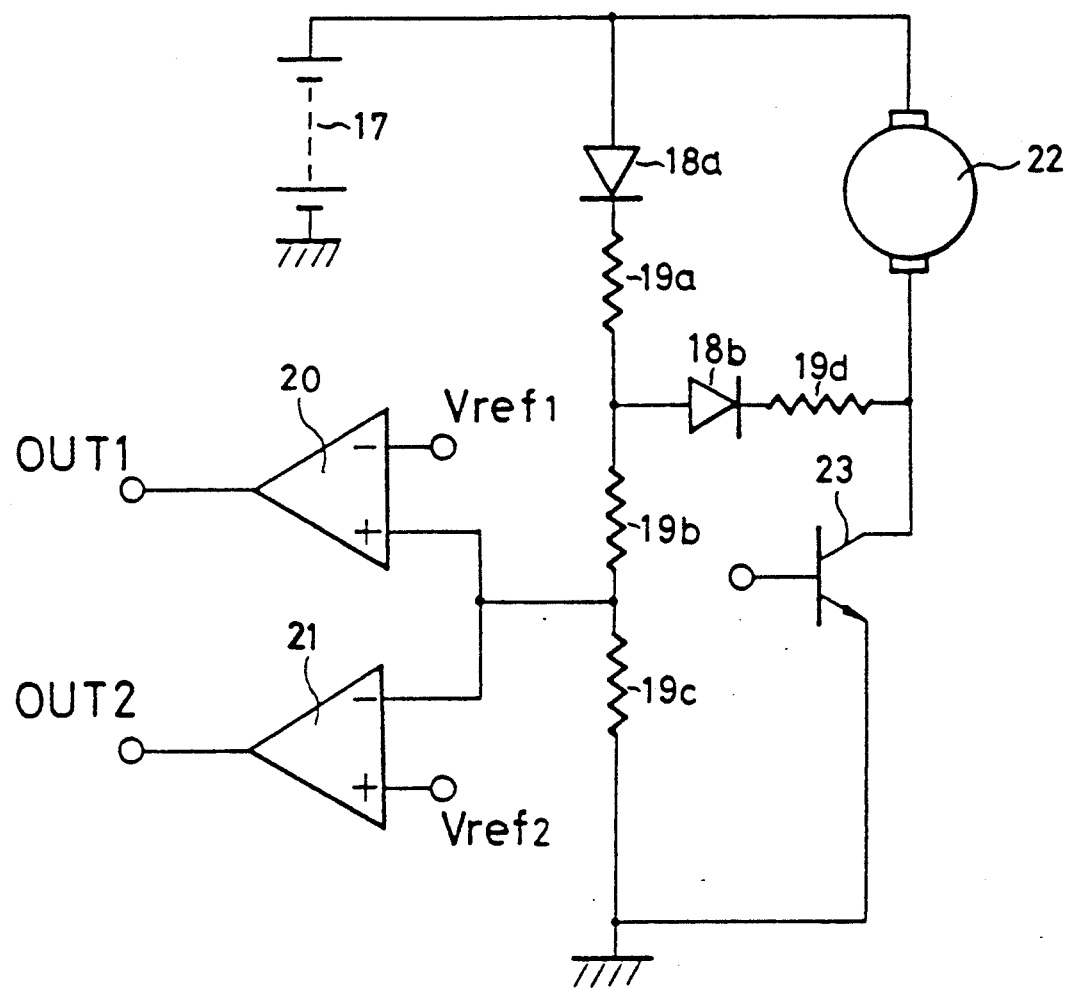
FIG. 1 is a circuit diagram for explaining the principle of the present invention.

FIG. 1 shows a circuit diagram for explaining the principle of the present invention. The minus terminal of battery 17 is grounded and the plus terminal is connected to a terminal of motor 22. The emitter of transistor 23 is grounded. Diode 18a, resistor 19a, resistor 19b and resistor 19c are serially connected between the plus terminal of battery 17 and ground. A connecting portion between resistors 19a and 19b is connected to the collector of transistor 23 through diode 18b and resistor 19d.

The voltage between the connecting portion of resistors 19b and 19c and ground as a detecting point, namely, the voltage drop of resistor 19c, is input to excess voltage detecting means 20 and short circuit detecting means 21 as the voltage to be compared. When an excess voltage is applied to transistor 23 for driving motor 22 due to an inadvertent erroneous connection of the plug of the charger to the plug receiver of the control apparatus shown in FIG. 1, this is detected by comparing the voltage to be compared with a reference voltage Vref1, thereby changing the state of the output (OUT1).

Short circuit detecting means 21 detects, by comparing the voltage to be compared with the reference voltage Vref2, whether motor 22 or transistor 23 is short-circuited. If transistor 23 is short-circuited, the state of output 2 is changed.

When an excess voltage is applied to transistor 23 and motor 22, the voltage to be compared of excess voltage detecting means 20 is larger than the reference voltage Vref 1. As a result, the state of the output (OUT1) of excess voltage detecting means 20 is changed from "L" to "H".

When transistor 23 is short circuited, the voltage to be compared of the short circuit detecting means 21 is lower than the reference voltage Vref2. As a result, the state of the output (OUT2) of short circuit detecting means 21 is changed from "L" to "H". By utilizing these changes, a buzzer is rung or a display light is switched on and off, thereby indicating the abnormal state. Alternatively, the power supply to the motor is cut off or the electric path to the whole load from the battery is cut off.

Figure 2:
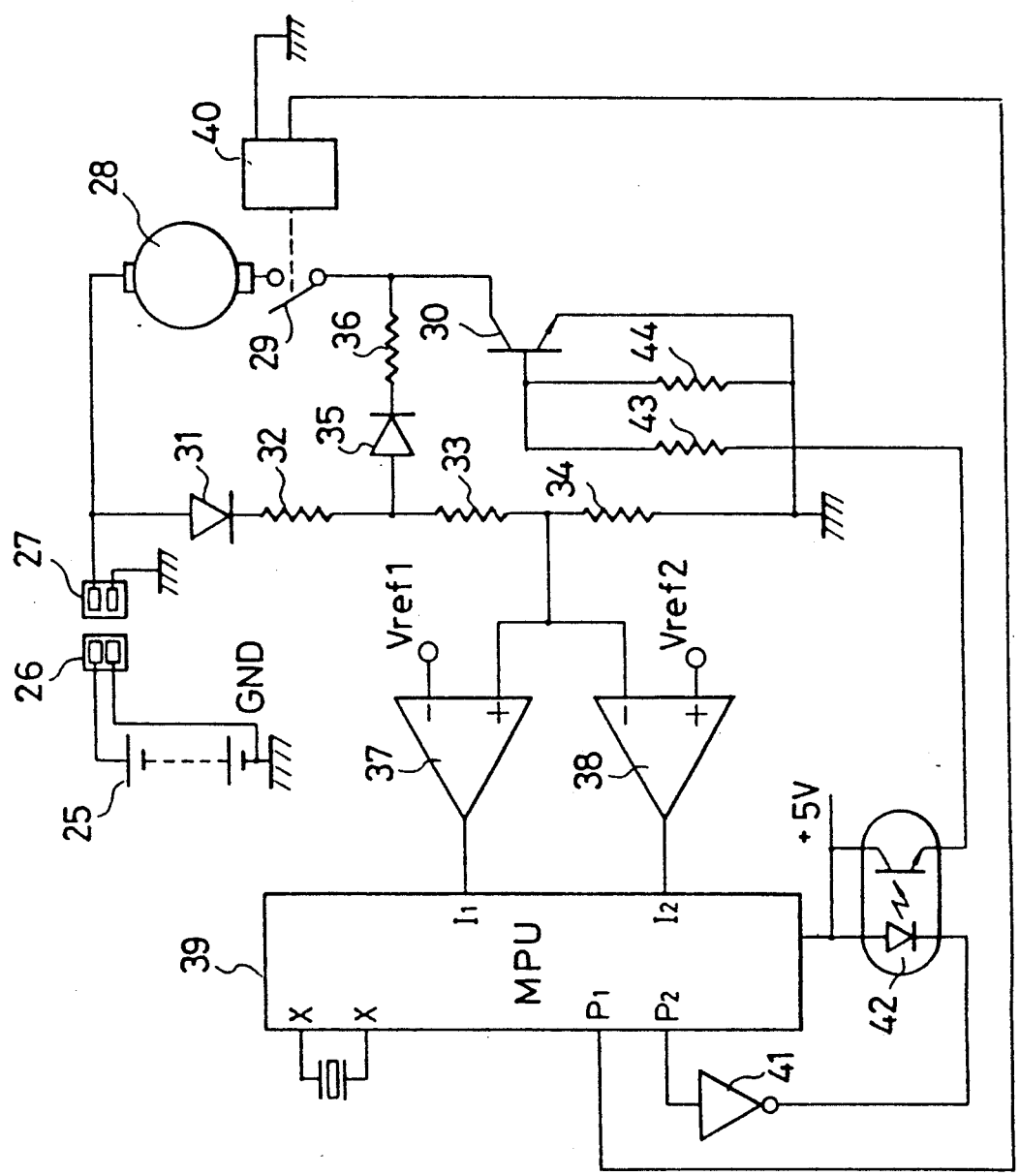
FIG. 2 is circuit diagram of the first embodiment of the present invention.

FIG. 2 shows the structure of an embodiment of the present invention. The minus terminal of battery 25 is connected to ground(GND) and the plus terminal is connected to one electrode of plug 26. One electrode of plug receiver 27 for receiving plug 26 is connected to one terminal of power motor 28 (for running) and the other electrode of plug receiver 27 is connected to ground (GND). The other terminal of motor 28 is connected to the collector of transistor 30 through contactor 29 and the emitter of transistor 30 is grounded.

Thus, the plus terminal of battery 25 is connected to one electrode of plug receiver 27 and the electrode of plug receiver 27 is connected to ground through diode 31, resistor 32, resistor 33 and resistor 34 in series. A connecting portion of resistor 32 and resistor 33 is connected to the collector of transistor 30 through diode 35 and resistor 36. The connecting portion of resistors 33 and 34 is connected to a plus terminal of comparator 37 and to a minus terminal of comparator 38. The reference voltage Vref1 for detecting the excess voltage is applied to an input terminal (−) of comparator 37 and the reference voltage of Vref2 for detecting a short circuit of transistor 30 is applied to the other input terminal (+) of comparator 38.

Respective outputs of comparators 37 and 38 are input to input ports $I_1$ and $I_2$ of an MPU (Micro Processor Unit) equipped with a CPU, a RAM, a ROM, parallel input and output ports, a timer, and a clock oscillation circuit. Output port $P_1$ of MPU 39 is connected to driver 40 of contactor 29. The other output port $P_2$ of MPU 39 is connected to the cathode of an LED in photocoupler 42 through an inverter 41. The emitter of the transistor within photocoupler 42 is connected to the base of transistor 30 through resistor 43. The anode of the LED in photocoupler 42 and the collector of the transistor in photocoupler 42 are connected to the power source (+5V). Inverter 41 and photocoupler 42 are used for controlling a base current of transistor 30, so that a driving operation of motor 28 is controlled. The base of transistor 30 is grounded through resistor 44.

A crystal oscillator connected to X, X terminals of MPU 39 is connected to an internal clock oscillator circuit. The program to be executed by the CPU in MPU 39 is written in a ROM equipped therein. The same structure as transistor 30, contactor 29, driver 40 and comparator 38 may be provided on a loading motor side which is not shown.

In FIG. 2, only one transistor is shown for driving the power motor and the load motor. However, a plurality of transistors may be used for the control, if necessary. The apparatus may be connected to MPU 39 by using an exclusive controller instead of MPU 39 or by using an exclusive control IC.

When an excess voltage is applied to transistor 30 and motor 28 due to an erroneous connection of the plug of the charger and the plug receiver of the control apparatus, the input voltage to be compared of comparator 37, namely, the voltage drop of resistor 34, becomes higher than reference voltage Vref1. As a result, the state of the output of comparator 37 is changed from "L" to "H" and the input port $I_1$ becomes "H" level. If transistor 30 is short-circuited, the input voltage to be compared of comparator 38, namely, the voltage drop of resistor 34, becomes lower than the reference voltage Vref2. The state of the output of comparator 38 is changed from "L" to "H", causing the input port $I_2$ to become "H" level.

Figure 3:
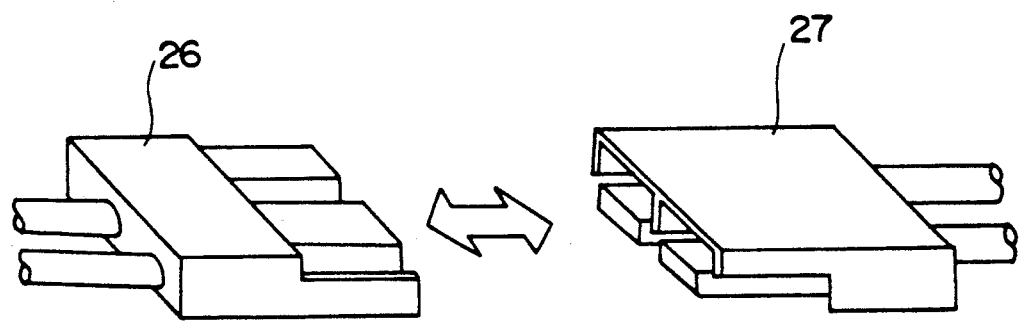
FIG. 3 is of a perspective view of a plug and a plug receiver used in the first embodiment.

FIG. 3 shows plug 26 and plug receiver 27 which have the same structure. This can be easily understood of turning the plug receiver 27 upside down.

Figure 4:
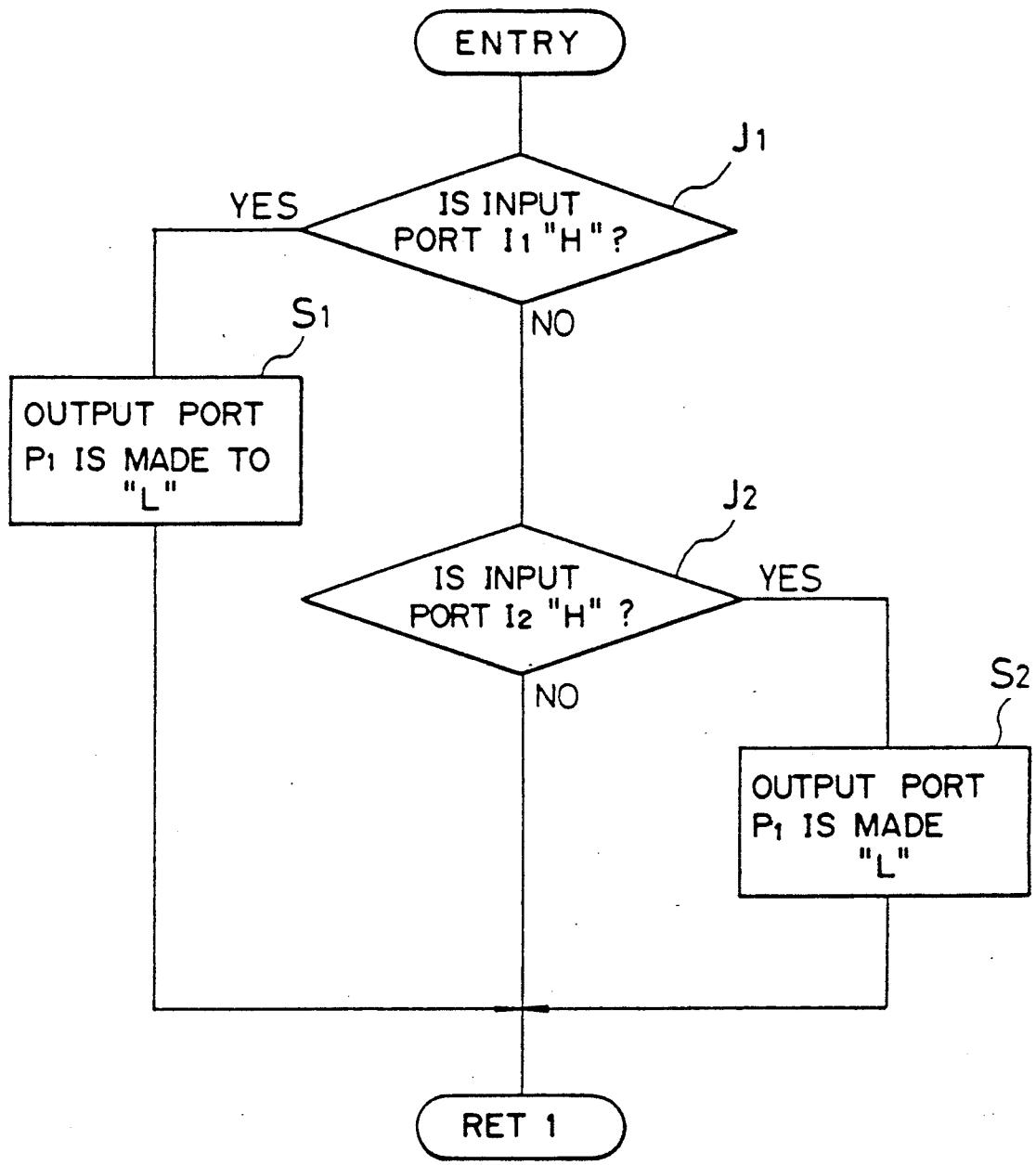
FIG. 4 is a flowchart for explaining the first embodiment of the present invention.

The flowchart shown in FIG. 4, a timer interruption program, is written in the ROM in MPU 39. This program may be executed every 100 ms, for example.

When an interruption occurs, judgment J1 judges whether the state of the input port I1 is "H" or "L" and whether or not the excess voltage is applied to the motor, for example. If the state of input port $I_1$ becomes "H" level, the process is branched to step S1 and the state of output port $P_1$ changes from "H" level to "L" level. As a result, contactor 29 is opened and the power supply to motor 28 is cut off, thereby stopping the rotation of the motor. Thereafter, the interruption process is completed and the process is returned to the main program. At judgment J1, if the state of the input port $I_1$ is "L" level, the process proceeds to judgment J2 and this time examines whether the state of the input port $I_2$ is "H" or "L", thereby judging whether or not transistor 30 is in a short-circuit state. If input port $I_2$ is at "H" level, the process branches to step S2, and the state of the output port $P_1$ is changed from "H" level to "L" level. As a result, contactor 29 is opened and the power supply to motor 28 is cut off, thereby stopping the rotation of the motor. Thereafter, the process completes the interruption routing and is returned to the main program. At judgment J2, if the state of input port $I_2$ is "L" level and the process is judged as being in a normal state, an operational state is maintained. Thus, the process completes the interruption routine, and is returned to the main program. If the same structure as the power motor is applied to the load motor, the other comparator, the other input, the other driver and the other output port, which corresponds to comparator 38, input port $I_2$, driver 40 and output port $P_1$ are respectively provided. Therefore, after judgment J2, another similar judgment routine is executed and the same process is applied to the load motor side.

Figure 5:
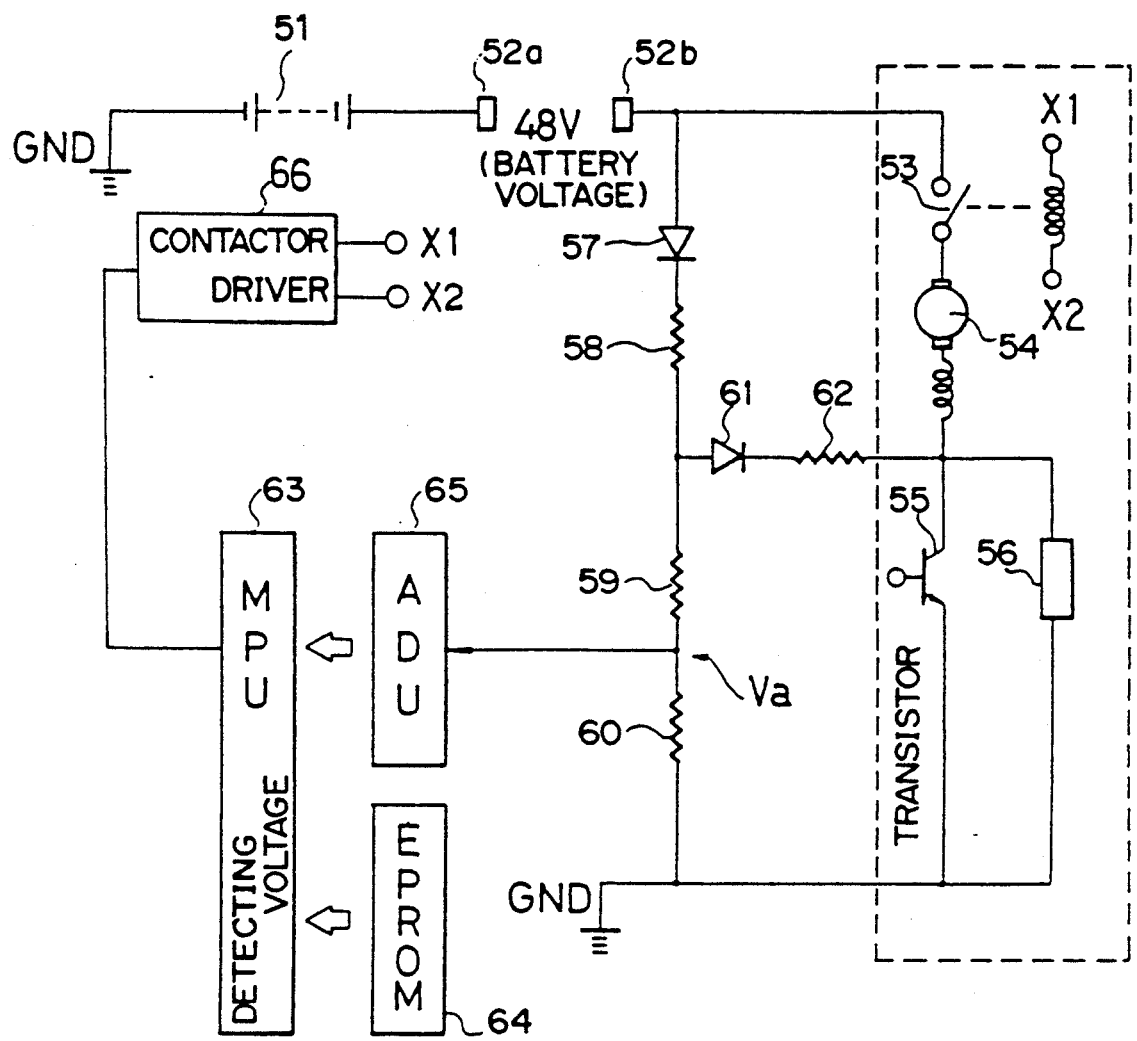
FIG. 5 is a block diagram of the second embodiment of the present invention.

FIG. 5 shows a circuit diagram of another embodiment. The minus terminal battery 51 is connected to ground (GND) and the plus terminal is connected to one terminal of power motor 54 through electrode 52a of a plug, electrode 52b of a plug receiver and contactor 53. The other terminal of power motor 54 is connected to the collector of transistor 55. In FIG. 5, power motor 54 is a direct-winding DC motor. A coil is shown for connecting the other terminal of power motor 54 and the collector of transistor 55 in an equivalent manner to represent a magnetic field winding wire.

The emitter of transistor 55 is grounded and surge absorber 56 is connected between the collector and ground.

Diode 57, resistor 58, resistor 59, and resistor 60 are serially connected between electrode 52b of the plug receive and around and a connecting portion between resistors 58 and 59 is connected to the collector of transistor 55 through diode 61 and resistor 62. MPU (Micro-Processor Unit) 63 is provided in the control apparatus, the MPU being equipped with CPU, RAM, parallel input and output ports, timer and clock oscillating circuit, and the program carried out by CPU in MPU 63 is written in EPROM 64. A connecting portion between resistor 59 and 60 is connected to an analog input terminal of ADU (Analog Digital converting Unit) 65. ADU 65 and EPROM 64 are connected to MPU 63 through a data bus, an address bus and a control bus. One bit of the output port of MPU 63 is connected to contactor driver 66 and the outputs X1 and X2 of contact driver 66 are connected to driving coils X1 and X2 of contactor 53. Although not shown in the drawing, the base of transistor 55 is connected to MPU 63 through a driver or an exclusive controller. A drive of a load motor is the same as that of power motor 54 and is thus omitted from the drawing.

During operation of the battery forklift, a short circuit fault of transistor 55 may occur, thus causing the current flowing through diode 61 and resistor 62 increase. Then, the current flowing through resistors 59 and 60, correspondingly decreases. If resistor 62 has a much lower resistivity than resistors 59 and 60, most of the current flowing through resistor 58 will flow through diode 61 and resistor 62. As a result, voltage Va, namely, a voltage drop across resistor 60, decreases to almost zero, or to only a few volts. As the voltage is applied to an analog input terminal of ADU 65, as recited above, ADU 65 converts the voltage to a digital value, this switching operation is read by the CPU in MPU 63. The CPU of MPU 63 executes the program stored in EPROM 64, and judges whether or not the voltage Va is abnormally low. The judgment is performed by reading a digital conversion value of ADU 65 and the converted value is compared with the predetermined voltage stored in EPROM 64. When voltage Va is abnormally low, the state of the output port of MPU 63 outputted from contactor driver 66 is changed (for example, "H" is changed to "L") and the contactor is opened, thereby cutting off current to the power motor and/or to the load motor, thus stopping the running of the forklift and/or the loading operation. When the voltage Va is within an allowable range of the determined voltage value, the apparatus operates normally.

Figure 6:
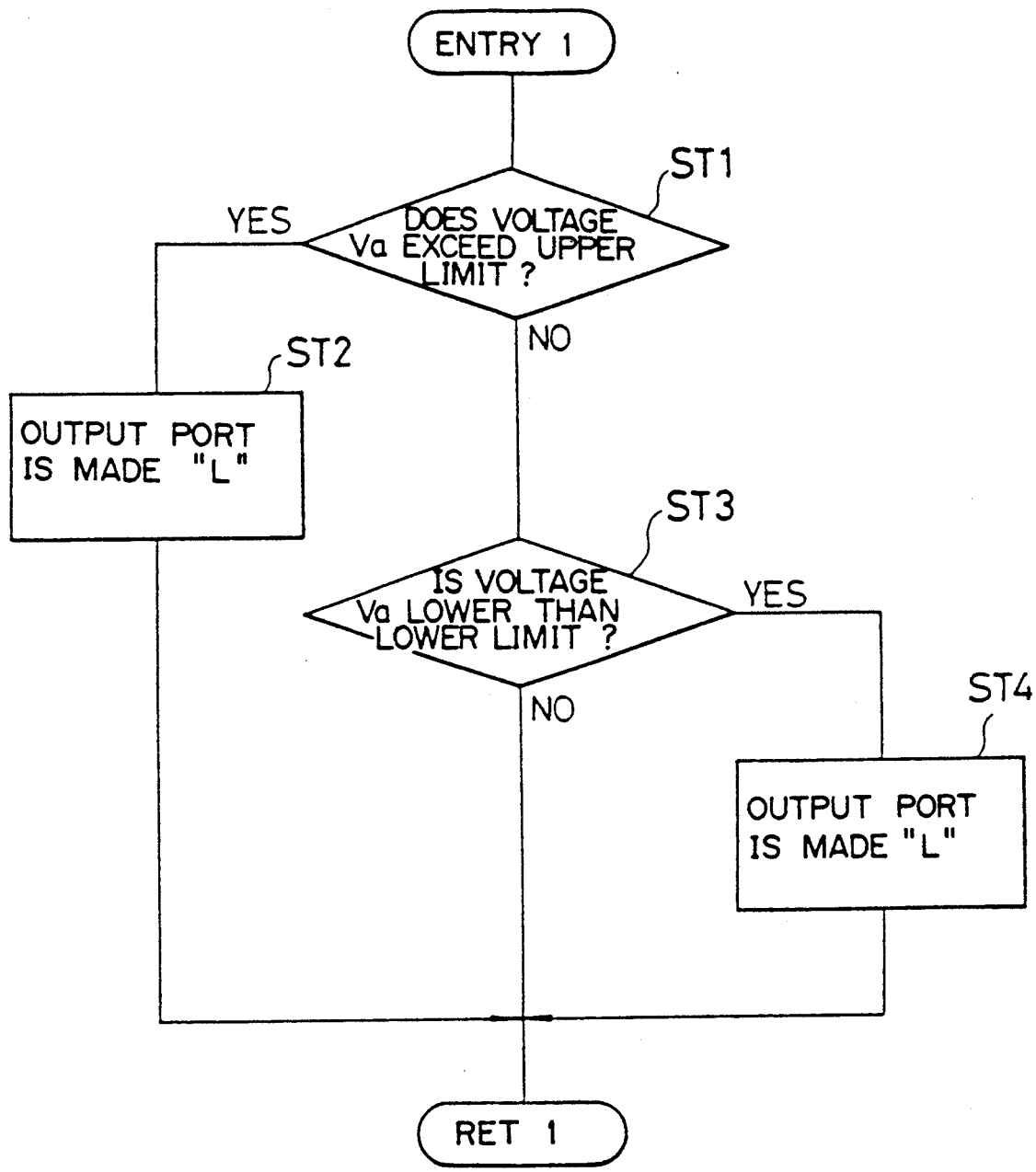
FIG. 6 is a flowchart for explaining the second embodiment of the present invention.

The program shown by the flowchart of FIG. 6 is written in EPROM 64 and is executed by a timer interruption in the same way as in the above recited program.

If an interruption occurs, at step ST1, the digital conversion value of ADU 65 corresponding to voltage Va is read out and the conversion value is compared with the upper limit of the voltage value previously provided in EPROM 64. When the conversion value is larger than the upper limitation of the voltage value, it is judged that an excess voltage is applied to the power motor 54 due to an erroneous connection of the plug of the charger and the plug receiver of the control apparatus shown in FIG. 5. In this case, the process branches to step ST2 and the status of the output port of MPU 63 output to contactor driver 66 is changed from "H" to "L" and contactor 53 is opened, thereby cutting off the power supply to power motor 54. As a result, power motor 54 stops rotation. After the execution of step ST2 is completed, the interruption process is ended and the process is returned to the main program.

At step ST1, when the voltage Va does not exceed the upper limitation of the voltage value, the process proceeds to step ST3. It is then examined whether or not the digital conversion value is lower than the lower limitation of the voltage value, which is set to be zero to a few volts, and it is judged whether or not transistor 55 is short-circuited. If the digital conversion value is lower than the lower limitation of the voltage value, the process proceeds to step ST4 and the state of the output port is changed from "H" to "L", thereby opening contactor 53 and cutting off the power supply to power motor 54. As a result, power motor 5,4, stops its rotation. After the execution at step ST4 is completed, the interruption process is ended and the process is return to the main program.

At step ST3, when the voltage Va is at a normal voltage, which is higher than the lower limitation of the voltage value, the state is judged as being normal. The current operation is therefore maintained and the interruption process is ended, and the process is returned to the main program. The same structure as transistor 55, contactor 53, and contactor driver 66 can be parallelly provided on the load motor side.

As explained in detail above, where the transistor causes a short-circuit fault and an improper plug is connected to the plug receiver, with an excess voltage applied to the transistor, the motor where these short circuit faults or the excess voltages occur can be immediately detected. The application of the voltage to the motor and the transistor is thus cut off, thereby preventing damage to the element of the control apparatus.

What is claimed is:

1. In an electrical drive means for a vehicle, said drive means comprising an electrically energizable motor, a control transistor with a plurality of terminals, a contactor, and an input connector having two electrodes for connection to an electrical power source, said input connector also accepting either of two separate connecting units, one of said units being connected to a first power source of a first voltage and the other of said units being connected to a second power source of a higher, second voltage, said motor, said control transistor and said contactor being connected in series between one of said electrodes and the other of said electrodes, a protection circuit for detecting a short circuit state of said transistor and a voltage applied to said electrodes in excess of said first voltage, said protection circuit comprising:

a first comparator with a first reference voltage source, means coupling said first comparator to said electrodes for enabling said first comparator to provide an output when the voltage between said electrodes exceeds said first voltage;

a second comparator with a second reference voltage source, means coupling said second comparator to said transistor for enabling said second comparator to provide an output when said transistor itself is in a short circuit state; and means for interrupting current to said motor connected to said first comparator and said second comparator and operable by said first comparator when the voltage applied to said electrodes exceeds said first voltage and operable by said second compactor when said control transistor is short-circuited.

2. An electrical drive means according to claim 1 wherein said second comparator provides said output thereof when the voltage across said transistor is less than the magnitude of said second reference voltage.

3. An electrical drive means according to claim 1 wherein said input connector is a plug receiver, said connecting units are plugs matable with said plug receiver, said power source of said first voltage having a battery of said first voltage connected to one of said plugs, and said power source of said second voltage having a battery charger of said second, higher voltage connected to the other of said plugs.

4. An electrical drive means according to claim 1 wherein said contactor has a closed state in which said motor is energized and an open state in which said motor is deenergized and said first comparator and said second comparator are connected to said contactor for operating said contactor to its open state.

5. An electrical drive means according to claim 1 wherein said first comparator is connected to an intermediate point of a voltage divider having two ends, one of which is connected to one of said electrodes and the other of which is connected to the other of said electrodes, the voltage at said intermediate point being proportional to the voltage between said electrodes.

6. An electrical drive means according to claim 5 wherein said second comparator is connected to an intermediate point of said voltage divider and further comprising circuit means interconnecting a terminal of said transistor with a point in said voltage divider electrically spaced from at least one of said electrodes.

7. In an electrical drive means for a vehicle, said drive means comprising an electrically energizable motor, a control transistor with a plurality of terminals, a contactor, and an input connector having two electrodes for connection to an electrical power source, said input connector also accepting either of two separate connecting units, one of said units being connected to a first power source of a first voltage and the other of said units being connected to a second power source of a higher, second voltage, said motor, said control transistor and said contactor being connected in series between one of said electrodes and the other of said electrodes, the method of detecting a short circuit state of said transistor and a voltage applied to said electrodes in excess of said first voltage comprising:

comparing the voltage applied to said transistor with a first reference voltage which has been preselected to provide an output when the voltage drop across said transistor is less than said first reference voltage; and comparing the voltage between said electrodes with a second reference voltage which has been preselected relative to said first voltage to provide an output when the voltage between said electrodes is higher than said first voltage.

* * * * *